Oct. 15, 1968   P. D. DUNN ET AL   3,406,090
NUCLEAR REACTOR FUEL ELEMENT
Filed Dec. 3, 1965   3 Sheets-Sheet 1

3,406,090
NUCLEAR REACTOR FUEL ELEMENT
Peter Douglas Dunn, Moulsford, Herbert Clucas Whitby, Abingdon, and Graham Rice, Wallingford, England, assignors to United Kingdom Atomic Energy Authority, London, England
Filed Dec. 3, 1965, Ser. No. 511,369
Claims priority, application Great Britain, Dec. 8, 1964, 36,813/64
1 Claim. (Cl. 176—73)

ABSTRACT OF THE DISCLOSURE

In a nuclear reactor the fuel elements are porous and a liquid coolant is fed to the element such that the coolant diffuses through the element and leaves the element as a vapour.

Figure 1:
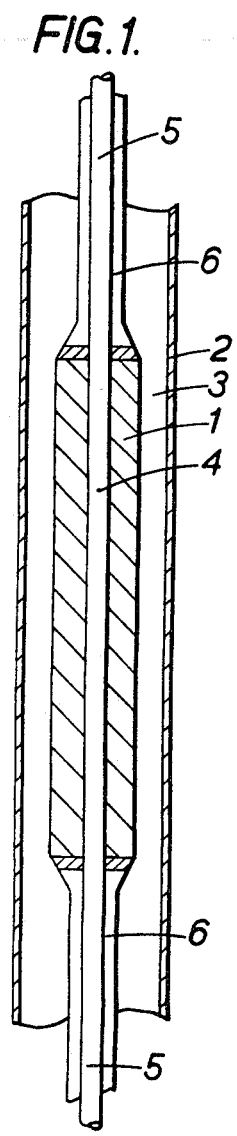

Preferably the fuel element is a hollow cylindrical body and the coolant diffuses radially through the element.

The coolant may be water or a liquid metal and the coolant may be fed to the center of the element to diffuse radially outwards, for example, in a pressure tube arrangement; or the coolant can be supplied as a liquid to the exterior of the element to diffuse radially inwards i.e. a pressure vessel arrangement.

---

This invention relates to nuclear reactors and fuel elements therefor.

When it is desired to utilize high coolant outlet temperatures from a nuclear reactor, for example, by providing high temperature superheated steam or a vapourised liquid metal, operating difficulties can arise due to the high fuel element surface temperatures necessary and in particular to the maximum temperature that the centre of the fuel element is capable of withstanding without deleterious effects. Various methods of overcoming these difficulties, i.e. by improving the heat transfer characteristics within and from the fuel element, have been suggested. None of the proposals have been completely successful and the object of the present invention is to provide a highly rated reactor system in which the fuel element heat transfer difficulties are minimised.

According to the present invention in a nuclear reactor the fuel elements are porous and a liquid coolant is fed to the element such that the coolant diffuses through the element and leaves the element as a vapour.

Preferably the fuel element is a hollow cylindrical body and the coolant diffuses radially through the element.

The coolant may be water or a liquid metal and the coolant may be fed to the centre of the element to diffuse radially outwards, for example, in a pressure tube arrangement or the coolant can be supplied as a liquid to the exterior of the element to diffuse radially inwards i.e. a pressure vessel arrangement.

Preferably the porosity of the element is nonuniform throughout the radial thickness of the element but increases in the direction of radial flow of the coolant. Various constructions are possible for the element.

(a) The element is formed as a plurality of concentric layers or tubes of sintered fuel having controlled porosities (b) The element comprises a stack of annular fuel discs separated by porous metal discs and mounted on a central apertured tube (c) The element consists of two porous tubes defining an annulus which is packed with coated fuel particles, the particles being arranged to vary in size to provide the desired radial porosity variation (d) The element comprises an inner porous fuel containing layer, a thermal insulating layer and an outer fuel containing layer, one of said fuel containing layers forming a boiling or vapourising zone and the other forming a superheating zone. The thermal insulating layer may have the form of a radial gas gap or the layer may comprise alumina powder or depleted uranium, and the fuel containing layers may be externally sheathed with a permeable material.

Using sodium coolant, the reactor may operate through an intermediate mercury loop incorporating a mercury turbine and a conventional steam loop, or the sodium coolant can be used to raise a secondary argon or helium loop to temperatures suitable for a M.H.D. generator.

Figure 5:
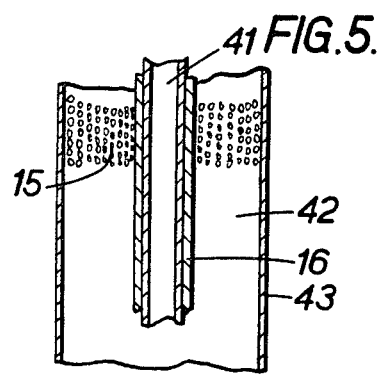
Figure 6:
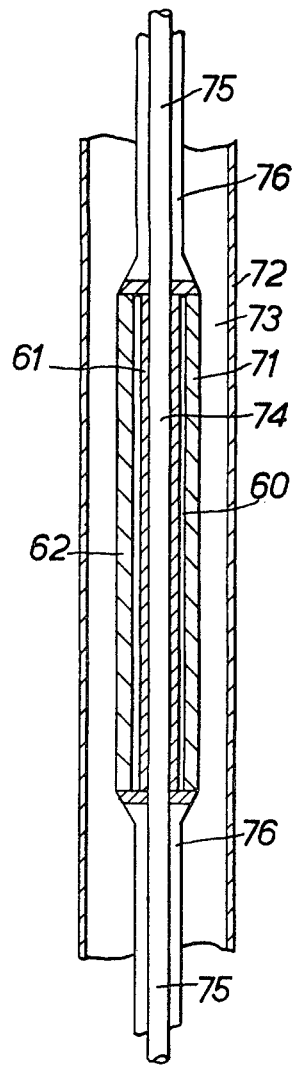
Figure 7:
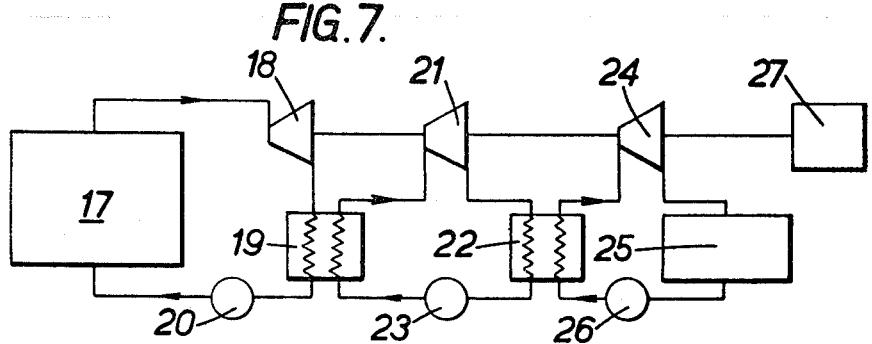
Figure 8:
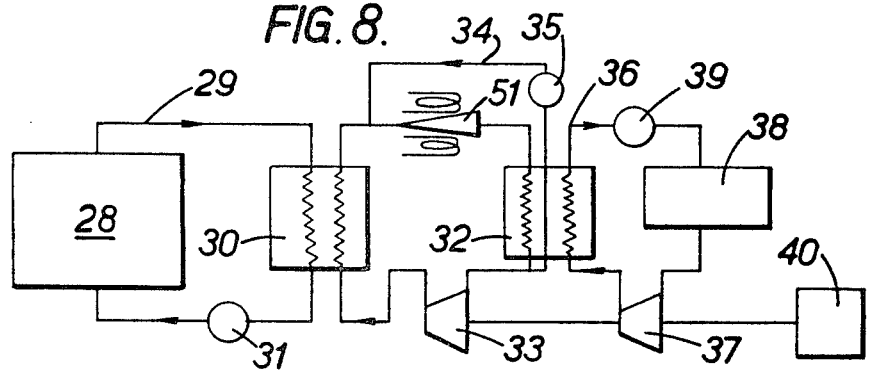

To enable the nature of the invention to be more readily understood embodiments of the invention will now be described by way of example with reference to the accompanying drawings. In the drawings:

FIG. 1 is a mid-sectional elevation of a porous fuel element located within a pressure tube FIGS. 2, 3, 4, 5 and 6 are sectional views of portions of a porous fuel element showing alternative forms of construction FIG. 7 is a diagrammatic arrangement of a sodium cooled reactor system FIG. 8 is a diagrammatic arrangement of a reactor system in combination with a M.H.D. generator and steam turbine.

Referring to FIG. 1 a fuel element comprises an elongated hollow porous body 1 formed from a nuclear fuel material. The fuel material may be uranium carbide in coated particle form dispersed in porous graphite or $UO_2$ in a porous zirconia matrix. The pore size may approximate to 40–80 microns providing a permeability of $5 \times 10^{-7}$ to $5 \times 10^{-8}$ centmeteres$^2$. The element is axially located within a pressure tube 2 such that an annular coolant duct 3 surrounds the porous body and the interior bore 4 of th body communicates with a further duct 5. Duct 5 extends from both ends of the body and comprises a double wall construction with a static gas gap 6 to provide thermal insulation between the ducts 3 and 5.

In operation a liquid coolant is fed through one of the ducts and diffuses radially through the porous body to issue as a vapour in the other duct. In the construction shown in FIG. 1 water is fed under pressure to the interior of the body via duct 5 and diffuses radially outward into the annular duct 3, issuing as steam. The phase change in the coolant occurs at an interface, the radial position of which may be varied by controlling the pressure conditions of the steam. Preferably the water is evaporated in the internal regions of the element and issues to the annular duct as a superheated steam. It will be appreciated that the temperatures of the fuel and coolant will be substantially similar during reactor operation thus permitting higher coolant temperatures to be utilised than hitherto.

In an alternative arrangement (not shown) the liquid coolant can be fed via duct 3 to diffuse radially inwards through the element into the central duct. The porous element may be used without a pressure tube for example in a boiling water reactor. In one such water-moderated reactor the moderator may be used as coolant and the water permitted to pass radially inwards through the fuel elements to emerge into the internal bore of the element as superheated steam. The core is enclosed within a pressure vessel and it will be appreciated that the vessel will operate at the relative low moderator temperature.

The invention is not limited to the use of light or heavy water coolant, other liquids may be used, for example, a liquid sodium is suitable and an arrangement utilising liquid sodium will be hereafter described.

Various constructions of the porous body are possible and it has been found advantageous to arrange the porosity of the body such that the porosity increases towards the surface from which the coolant vapour issues.

Figure 2:
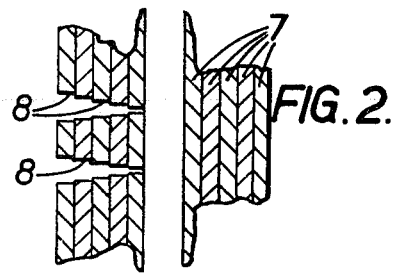

FIG. 2 illustrates a construction in which a nuclear fuel in the form of coated particles of uranium carbide is sintered into a series of concentric tubes 7, the porosity of the tubes being arranged such that upon assembly the body 1 has pores 8 which increase substantially uniformly in cross-sectional area between the inner and outer surfaces of the body.

Figure 3:
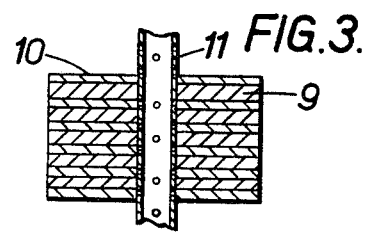

FIG. 3 shows a fuel element in which alternate layers of a nuclear fuel 9 and porous metal discs 10, are assembled on a central apertured liquid coolant tube 11. The tube may be of stainless steel.

Figure 4:
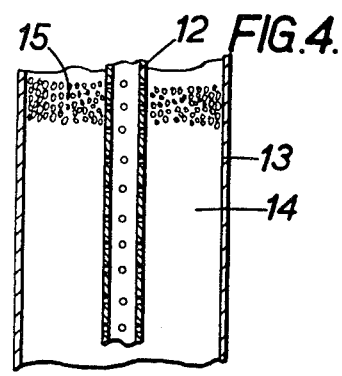

FIG. 4 shows a fuel element comprising two porous tubes 12 and 13 co-axially arranged to form an annulus 14, the annulus is packed with coated nuclear fuel particles 15 the size of the particles being graduated radially such that the particles adjacent the outer tube are larger than those adjacent the inner tube. The particles may be coated with any of the conventional fission retaining layers for example, pyrolytic carbon.

In some forms of operation, it has been found advantageous to divide the fuel element into two thermally isolated zones and boiling or vapourising zone and a superheating zone. The zones may be separated by a gas gap or a layer of a thermal barrier material may be interposed between the zones. The provision of a thermal barrier between the zones ensures that the superheating zone operates at a higher temperature than the vapourising zone and minimises any tendency of the element to attain a uniform temperature due to the thermal conductivity of the element materials. Suitable forms of element are illustrated in FIGS. 5 and 6, but it will be appreciated that the relative positions of the vapourising zone and the superheating zone is dependent upon the direction of the coolant flow. It will also be appreciated that the boiling or vapourising zone and the superheating zone may be axially spaced such that the coolant fluid diffuses through one zone and then by the provision of suitable baffles the fluid can be directed to diffuse through the other zone.

Referring firstly to FIG. 5, a fuel element comprises an inner porous fuel containing tube 41 of sintered construction, forming a boiling or vapourising zone, a porous thermal layer 16 and an outer fuel containing annulus 42 forming a superheating zone. The outer annulus 42 which comprises an assembly of sintered fuel particles is contained within a porous envelope or sheath 43. The thermal barrier 16 is formed from alumina powder $Al_2O_3$ or alternatively depleted uranium may be used.

FIG. 6 shows a fuel element substantially similar to that shown in FIG. 1 in that the fuel element comprises an elongated hollow element formed by two annular fuel containing bodies 61, 62 spaced apart to define an annular gas space or gap 60. The fuel bodies are axially located within a pressure tube 72 such that an annular coolant duct 73 surrounds the bodies and the interior bore 74 of the element communicates with a further duct 75. Duct 75 is provided with a double wall construction defining a static gas gap 76 and providing thermal insulation between the ducts 73 and 75. The liquid coolant preferably flows inwardly from duct 73, vapourising during its passage through the fuel containing body 62 and becoming superheated as it passes through body 61 into the outlet duct 75. The radial clearance between the bodies is preferably large in relation to the body pore sizes.

A reactor system using porous elements with sodium liquid coolant is shown in FIG. 7 and comprises three separate fluid circuits e.g. sodium, mercury and water.

The reactor 17 is cooled by sodium liquid which is vapourised in the porous fuel elements as previously described, the sodium vapour circulating through a turbine 18, heat exchanger 19 and pump 20. Heat exchanger 19 transfers heat to a mercury circuit comprising a mercury vapour turbine 21, a mercury/water heat exchanger 22 and pump 23. The water circuit includes a steam turbine 24, condenser 25 and feed pump 26. The turbines 18, 21 and 24 are interconnected to drive a generator 27.

In the system described high coolant temperatures are possible and it is advantageous to use an intermediate mercury circuit since the thermodynamic properties of sodium and steam provide a temperature gap which can be conveniently matched by the use of a mercury turbine containing circuit.

In both heat exchangers the heat transfer will be by condensation and evaporation and thus the heat exchanger surfaces can be relatively small.

FIG. 8 shows a diagrammatic arrangement in which a reactor using porous fuel elements with sodium liquid coolant is combined with a magnetothermodynamic generator.

In order to obtain a useful overall thermodynamic efficiency a steam turbine is provided to utilise heat rejected by the magnetothermodynamic generator. The primary circuit comprises a sodium liquid cooled reactor 28, a sodium coolant loop 29, primary heat exchanger 30 and pump 31. The secondary circuit, which preferably contains argon or helium, supplies gas at approximately 1000° C. to the MHD generator 51, the gas having been previously seeded with potassium. After passing through the generator the gas enters a gas/water heat exchanger 32, is de-seeded and compressed in compressor 33 before re-entering the primary heat exchanger 30. The reclaimed potassium is recycled via duct 34 and pump 35.

Heat exchanger 32 transfers heat to the conventional water/steam loop 36, comprising turbine 37, condenser 38 and feed pump 39. The turbine preferably drives the compressor 33 and an electrical generator 40.

It will be appreciated that by using an indirect coolant system with sodium liquid it is possible to use higher coolant temperatures in the reactor and good core ratings without excessive fuel element temperatures.

We claim:
1. A nuclear fuel containing element comprising:
 (a) a plurality of concentric tubes of porous sintered fuel material together forming an elongated hollow cylindrical fuel body of porous wall construction,
 (b) a liquid tight casing enclosing said fuel body,
 (c) means to supply a liquid coolant to the interior of said casing, and
 (d) duct means connected to the interior of said fuel body to permit the removal of vaporous coolant from the interior of said body.

References Cited
UNITED STATES PATENTS

| | | | |
|---|---|---|---|
| 2,812,303 | 11/1957 | Daniels | 176—57 |
| 3,177,123 | 4/1965 | Huet | 176—54 |

FOREIGN PATENTS

| | | |
|---|---|---|
| 1,316,633 | 12/1962 | France. |
| 1,383,809 | 11/1964 | France. |
| 845,804 | 8/1960 | Great Britain. |
| 897,373 | 5/1962 | Great Britain. |
| 946,901 | 1/1964 | Great Britain. |
| 998,387 | 7/1965 | Great Britain. |

BENJAMIN R. PADGETT, *Primary Examiner.*

MELVIN J. SCOLNICK, *Assistant Examiner.*